(12) United States Patent
Fry et al.

(10) Patent No.: US 10,317,650 B1
(45) Date of Patent: Jun. 11, 2019

(54) INFRARED IMAGING SYSTEM WITH AN ATHERMALIZED DUAL-BAND ULTRA-WFOV OPTICAL SYSTEM AND METHOD

(71) Applicant: LOCKHEED MARTIN CORPORATION, Bethesda, MD (US)

(72) Inventors: James A. Fry, Orlando, FL (US); William G. Norris, Orlando, FL (US); John A. Savage, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 226 days.

(21) Appl. No.: 15/358,089

(22) Filed: Nov. 21, 2016

(51) Int. Cl.
| | |
|---|---|
| *G02B 5/00* | (2006.01) |
| *G02B 7/02* | (2006.01) |
| *H04N 5/33* | (2006.01) |
| *G02B 13/00* | (2006.01) |
| *G02B 26/08* | (2006.01) |
| *G02B 27/00* | (2006.01) |
| *G02B 27/10* | (2006.01) |
| *H04N 5/225* | (2006.01) |
| *H04N 5/232* | (2006.01) |

(52) U.S. Cl.
CPC .......... *G02B 13/008* (2013.01); *G02B 5/005* (2013.01); *G02B 7/028* (2013.01); *G02B 26/08* (2013.01); *G02B 27/0025* (2013.01); *G02B 27/106* (2013.01); *H04N 5/2252* (2013.01); *H04N 5/2259* (2013.01); *H04N 5/23238* (2013.01); *H04N 5/33* (2013.01)

(58) Field of Classification Search
CPC ...... G02B 13/008; G02B 5/005; G02B 5/006; G02B 7/028; G02B 26/08; G02B 26/0875; G02B 26/0883; G02B 26/0891; G02B 26/10; G02B 26/108; G02B 27/0025; G02B 27/0031; G02B 27/005; G02B 27/0068; G02B 27/10; G02B 27/106; G02B 13/002; G02B 3/02; H04N 5/2252; H04N 5/2259; H04N 5/23238; H04N 5/33; H04N 5/332
See application file for complete search history.

(56) References Cited

U.S. PATENT DOCUMENTS

| | | | |
|---|---|---|---|
| 5,258,618 A | * | 11/1993 | Noble ........................ G01J 5/08 250/332 |
| 5,389,791 A | | 2/1995 | Passmore |
| 6,208,459 B1 | | 3/2001 | Coon et al. |

(Continued)

*Primary Examiner* — Derek S. Chapel
*Assistant Examiner* — Adam W Booher
(74) *Attorney, Agent, or Firm* — Terry M. Sanks, Esq.; Beusse Wolter Sanks & Maire, PLLC

(57) ABSTRACT

Embodiments include an optical system comprising a plurality of powered optical elements, arranged within a same optical path, configured to simultaneously pass and focus therethrough mid-wave infrared (MWIR) and long-wave infrared (LWIR) spectral bands to a focal plane array (FPA) and provide simultaneous correction of monochromatic and chromatic aberrations over the MWIR and LWIR spectral bands with a low f-theta distortion. The plurality of powered optical elements comprises a first set of powered lenses having a passive athermalized response over fluctuating temperatures in a variable temperature environment; and a second set of powered lenses to operate in a constant cryogenically cooled environment. A method and a situational-awareness device are also disclosed.

20 Claims, 10 Drawing Sheets

(56) References Cited

U.S. PATENT DOCUMENTS

| | | |
|---|---|---|
| 6,950,243 B2 | 9/2005 | Wiese et al. |
| 7,218,444 B2 | 5/2007 | Cook |
| 7,363,303 B2 | 4/2008 | Cipriano et al. |
| 7,408,159 B1 | 8/2008 | Amon |
| 7,863,570 B2 | 1/2011 | Myers et al. |
| 7,933,067 B1 | 4/2011 | Cook |
| 8,294,988 B2 | 10/2012 | Cook |
| 8,334,490 B2 | 12/2012 | Schaub et al. |
| 8,601,421 B2 | 12/2013 | Tener et al. |
| 8,724,216 B2 | 5/2014 | Vizgaitis |
| 9,110,276 B2 | 8/2015 | Cook |
| 9,207,434 B2 | 12/2015 | Stayer |
| 2006/0255275 A1 | 11/2006 | Garman et al. |
| 2010/0053609 A1 | 3/2010 | Chrisp |
| 2011/0080483 A1 | 4/2011 | Oster et al. |
| 2013/0221206 A1 | 8/2013 | Crowther et al. |
| 2015/0241667 A1* | 8/2015 | Staver .................. G02B 13/146 250/349 |

* cited by examiner

FIG. 9

| # | Type | Comment | Radius | Thickness | Material | Semi-Diameter | Conic | A4 | A6 | A8 | A10 |
|---|---|---|---|---|---|---|---|---|---|---|---|
| 0 | STANDARD | MWIR | Infinity | 10000000000 | | 0 | 0 | 0 | 0 | 0 | 0 |
| 1 | STANDARD | | Infinity | 0.05 | | 0.880 | 0 | 0 | 0 | 0 | 0 |
| 2 | EVENASPH | LENS 1 | 0.716 | 0.043 | GERMANIUM | 0.520 | 0 | -0.1510 | -0.2578 | -2.7104 | 0 |
| 3 | STANDARD | | 0.554 | 0.704 | | 0.450 | 0 | 0 | 0 | 0 | 0 |
| 4 | STANDARD | LENS 2 | 1.725 | 0.04 | BAF2 | 0.420 | 0 | 0 | 0 | 0 | 0 |
| 5 | STANDARD | | 1.288 | 0.071 | | 0.420 | 0 | 0 | 0 | 0 | 0 |
| 6 | STANDARD | LENS 3 | 2.062 | 0.1 | IRG26 | 0.420 | 0 | 0 | 0 | 0 | 0 |
| 7 | STANDARD | | -8.981 | 0.05 | | 0.420 | 0 | 0 | 0 | 0 | 0 |
| 8 | TILTSURF | RISLEY WEDGE | Infinity | 0.047 | GERMANIUM | 0.400 | 0 | 0.0030 | 0 | 0 | 0 |
| 9 | STANDARD | | Infinity | 0.05 | | 0.366 | 0 | 0 | 0 | 0 | 0 |
| 10 | STANDARD | DEWAR WINDOW | Infinity | 0.039 | GERMANIUM | 0.380 | 0 | 0 | 0 | 0 | 0 |
| 11 | STANDARD | | Infinity | 0.04 | | 0.380 | 0 | 0 | 0 | 0 | 0 |
| 12 | STANDARD | COLD STOP | Infinity | 0.118 | | 0.313 | 0 | 0 | 0 | 0 | 0 |
| 13 | EVENASPH | LENS 4 | 6.201 | 0.08 | GERMANIUM | 0.392 | 0 | -0.2920 | 3.6186 | -34.1612 | 116.0834 |
| 14 | STANDARD | | -4.102 | 0.209 | | 0.394 | 0 | 0 | 0 | 0 | 0 |
| 15 | EVENASPH | LENS 5 | 0.874 | 0.04 | IRG26 | 0.380 | 0 | -0.1916 | 1.2863 | -9.6464 | 9.3263 |
| 16 | STANDARD | | 0.652 | 0.460 | | 0.387 | 0 | 0 | 0 | 0 | 0 |
| 17 | STANDARD | IMAGE | Infinity | 0 | | 0.500 | 0 | 0 | 0 | 0 | 0 |

900

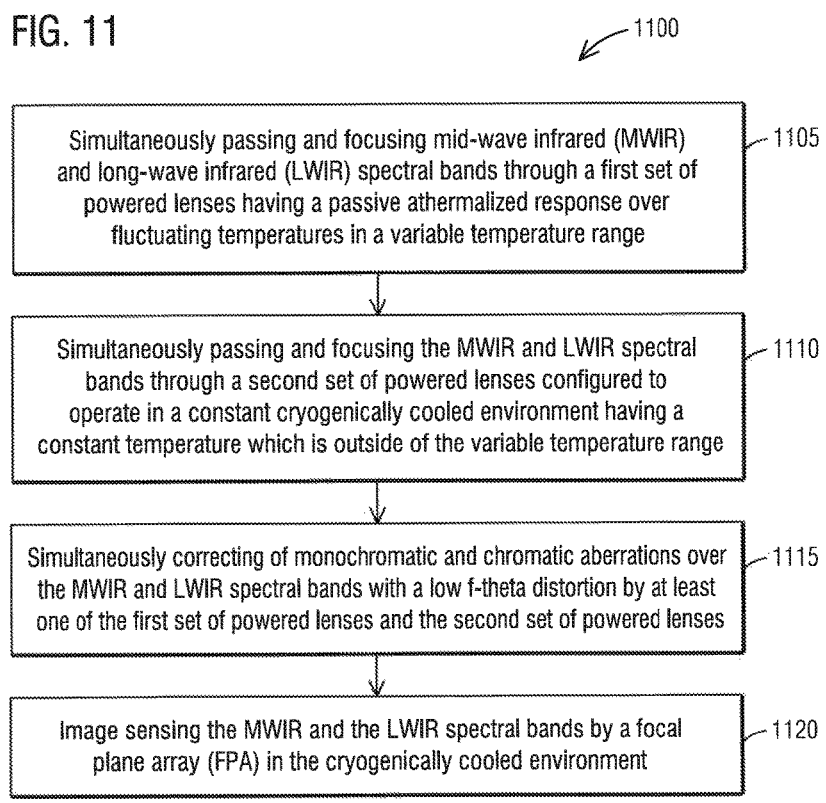

INFRARED IMAGING SYSTEM WITH AN ATHERMALIZED DUAL-BAND ULTRA-WFOV OPTICAL SYSTEM AND METHOD

BACKGROUND

Embodiments relate to an infrared imaging system with an athermalized dual-band ultra-wide field-of-view (WFOV) optical system and method.

Imaging systems that occupy a small volume of space have been designed with optical systems with high F/numbers and smaller focal plane arrays (FPAs). Additionally, these small imaging systems have been designed as monochromatic mid-wave infrared (MWIR) systems. As situational-awareness devices for surveillance become common place, dual-band imaging systems which are also miniaturized are needed.

Infrared detectors include a focal plane array (FPA) being cryogenically cooled in a dewar within an enclosure with a warm optical window. The enclosure however is subject to temperature variations of the surrounding environment which causes expansion and contraction variations or shifting due to the temperature fluctuations. As the enclosure expands and contracts (i.e., shifts) as a function of the temperature variations of the environment, so does the FPA shift. This shift can cause various optical distortions.

SUMMARY

Embodiments relate to an infrared imaging system with an athermalized dual-band ultra-wide field-of-view (WFOV) optical system. The bands may include the mid-wave infrared (MWIR) wavelength band and the long-wave infrared (LWIR) wavelength band. An aspect of the embodiments includes an optical system comprising a plurality of powered optical elements, arranged within a same optical path, configured to simultaneously pass and focus therethrough mid-wave infrared (MWIR) and long-wave infrared (LWIR) spectral bands to a focal plane array (FPA) and provide simultaneous correction of monochromatic and chromatic aberrations over the MWIR and LWIR spectral bands with a low f-theta distortion. The plurality of powered optical elements comprises a first set of powered lenses having a passive athermalized response over fluctuating temperatures in a variable temperature environment; and a second set of powered lenses to operate in a constant cryogenically cooled environment.

An aspect of the embodiments includes an imaging device comprising a housing assembly with a first housing section having a variable temperature environment and a second housing section having a cryogenically cooled environment being maintained at a constant temperature. The device includes an optical system having a first set of powered lenses to provide a passive athermalized response over fluctuating temperatures in the variable temperature environment and a second set of powered lenses configured to operate in the cryogenically cooled environment, the optical system to provide simultaneous correction of monochromatic and chromatic aberrations over dual infrared spectral bands with a low f-theta distortion. A focal plane array (FPA) in the cryogenically cooled environment has a diagonal dimension larger than a diameter of each powered lens in the second set of powered lenses to image the dual infrared spectral bands.

Another aspect of the embodiments includes a method comprising: simultaneously passing and focusing mid-wave infrared (MWIR) and long-wave infrared (LWIR) spectral bands through a first set of powered lenses having a passive athermalized response over fluctuating temperatures in a variable temperature range; simultaneously passing and focusing the MWIR and LWIR spectral bands through a second set of powered lenses configured to operate in a constant cryogenically cooled environment having a constant temperature which is outside of the variable temperature range; simultaneously correcting of monochromatic and chromatic aberrations over the MWIR and LWIR spectral bands with a low f-theta distortion by the first set of powered lenses and the second set of powered lenses; and image sensing the MWIR and the LWIR spectral bands by a focal plane array (FPA) in the cryogenically cooled environment.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 9 illustrates a table of the prescription parameters of the athermalized dual-band ultra-WFOV optical system;

FIG. 11 illustrates a flowchart of a method of dual-band optical processing.

DETAILED DESCRIPTION

Figure 1:
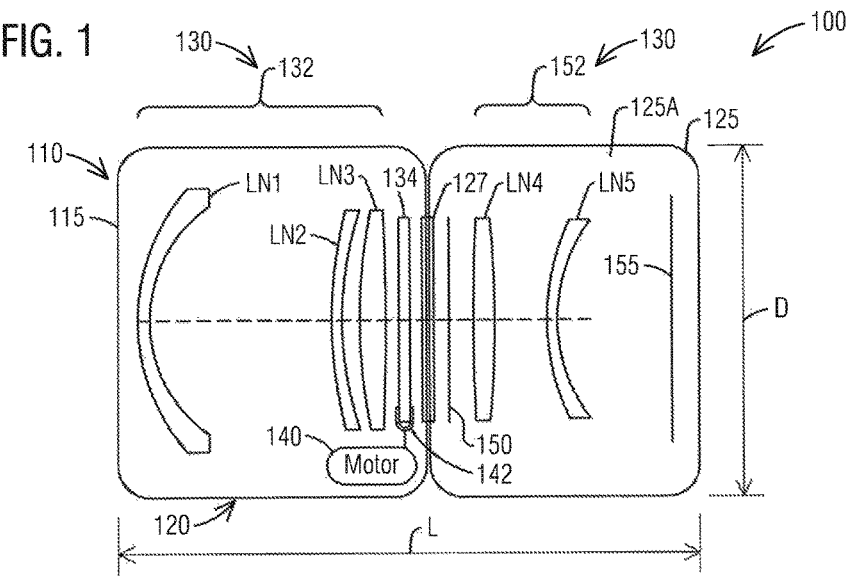
FIG. 1 illustrates a dual-band infrared imaging device with an athermalized dual-band ultra-WFOV optical system.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

The terms right, left, upward, downward, front, back and side are only used as a frame of reference for describing components herein and are not to be limiting in any way.

The infrared imaging device of the embodiments described herein includes an athermalized dual-band ultra-WFOV optical system with a plurality of powered optical elements at disparate temperatures. Embodiments relate to an infrared imaging device with an athermalized dual-band ultra-wide field-of-view (WFOV) optical system for situational-awareness infrared imaging systems. The bands may include the mid-wave infrared (MWIR) wavelength band and long-wave infrared (LWIR) wavelength band, which nominally extend from 3.0 to 5.0 micrometers wavelength and from 8.0 to 12.0 micrometers wavelength, respectively.

The dual-band imaging device of the embodiments described herein has a low F/number and a focal plane array (FPA) having a size which is maximized for the volume of space in the dewar by using frame-stacking through a spinning wedge element. In some embodiments, the diagonal extent of the FPA may be larger than the diameter of lenses in the dewar.

The embodiments herein maximize usage of the available space in and out of the cold space (dewar) in order to reduce the size of the housing while providing a wide field of view with low f-theta distortion.

FIG. 1 illustrates a dual-band infrared imaging device 100 with an athermalized dual-band ultra-WFOV optical system 120. The dual-band imaging device 100 may include a housing assembly 110 for housing therein the athermalized dual-band ultra-WFOV optical system 120. The housing assembly 110 has a length L and a diameter D. The length L of the housing assembly 110 may be approximately 2.1 inches. The diameter D may be 1 inch. The housing assembly 110 includes a first housing section 115 and a second housing section 125, the second housing section 125 may be a housing for a dewar 125A. The interior of the housing section 125 provides a cold space. The dewar 125A may be cryogenically cooled. Within the dewar 125A there is a cold stop 150. For the sake of brevity, the imaging device 100 may include additional components including, without limitations, processors, read-out integrated circuit (ROIC), spacers, etc. not specifically addressed herein. In some embodiments, the imaging device 100 may be a polychromatic imaging device.

The dewar 125A may include a dewar window 127, a cold stop 150 and a focal plane array (FPA) 155. In an embodiment, the FPA 155 may have a geometric shape such as a square or rectangle. By way of non-limiting example, a square-shaped FPA 155 may have 1024 pixels horizontally and 1024 pixels vertically. FPAs with larger or smaller dimensions may be used. Each pixel of the FPA 155 may also be square. By way of non-limiting example, the pixel may be 20 micrometers along a horizontal side and 20 micrometers along a vertical side.

The FPA 155 is configured to capture or perform image sensing of electromagnetic radiation in both MWIR and LWIR wavelength bands. The FPA 155 generates signals which may be fed to a read-out integrated circuit (ROIC) (not shown).

The athermalized dual-band ultra-WFOV optical system 120 may comprise a plurality of powered optical elements 130, the dewar window 127, and the cold stop 150. The maximum front-vertex-to-FPA length of the optical system 120 may be less than 2.1 inches. However, in some embodiments with larger housing sections, the plurality of powered optical elements 130 may include a front-vertex-to-FPA length which is equal to or less than 5.5 inches. Furthermore, the optical system 120 may have an F/number (F/#) of 1.4. The definition of the F/Number of an optical system is the focal length of the optical system divided by the diameter of the entrance pupil. In some embodiments, the plurality of powered optical elements may provide a diagonal field of view (FOV) of at least 120° and less than 125°. Other FOVs may also be possible.

The plurality of powered optical elements 130 may be configured to operate at disparate temperatures around the cold stop 150 and which collectively have a passive athermalized response over fluctuating temperatures. The plurality of powered optical elements 130 may be configured to produce an athermalized dual-band ultra-WFOV optical path having a common principal axis over the mid-wave infrared (MWIR) and long-wave infrared (LWIR) wavelength bands. The plurality of powered optical elements 130 being configured to have a passive athermalization response to the temperature range of fluctuation in the operational environment for which the powered optical elements are housed using optical material.

The plurality of powered optical elements 130 includes a first set of powered lenses 132 and a second set of powered lenses 152. The first set of powered lenses 132 operates in the variable temperature environment of the first housing section 115 which may have a first operational temperature range of approximately −30° C. to +68° C. Therefore, in real-time operation, the temperature of the first set of powered lenses 132 may vary or fluctuate. As is known, the refractive index of optical material of a particular lens may vary in response to the real-time (current) temperature. The fluctuating operational temperature range is a first temperature range of fluctuation. Each lens in the first set of powered lenses 132 may have an independent response over the real-time temperature in the housing environment associated with housing section 115. In the embodiments, the materials of the plurality of powered optical elements 130 may be selected to effectuate the passive athermalized response to the first temperature range of fluctuation from, for example, −30° C. to +68° C. Other temperature ranges are possible including subsets within the first temperature range.

The first set of powered lenses 132 includes lens LN1, lens LN2, and lens LN3 which are in a variable temperature environment of the first housing section 115. In some embodiments, the lens LN1, lens LN2, and lens LN3 are made of two or three different optical materials. For example, lens LN1 is made of a first material; lens LN2 is made of a second material; and lens LN3 is made of a third material. In some embodiments, the first material may be different from the second material and the third material. Furthermore, the second material may be different from the third material.

Lens LN1 and lens LN2 may be diverging lenses (convex-concave) wherein the diameter of LN1 may be larger than the diameter of LN2. The diverging lens diverges light rays of electromagnetic radiation propagating along and parallel to the principal axis. The concave surfaces of lens LN1 and lens LN2 are the trailing surfaces or exit surfaces of the diverging lenses. The convex surfaces of lens LN1 and lens LN2 are the leading surfaces or the entrance surfaces of the diverging lenses. The diameter of the lens LN1 is less than the diameter of the housing assembly 110. Hence, by way of non-limiting example, the diameter of lens LN1 is less than 1 inch.

Lens LN3 may be a bi-convex lens. The lens LN3 includes an input or leading surface which is convex. The exit surface or trailing surface of lens LN3 is essentially convex.

The athermalized dual-band ultra-WFOV optical system 120 may comprise a decentered optical element. By way of non-limiting example, the decentered optical element may comprise an optical wedge element 134. The optical wedge element 134 may follow the first set of powered lenses 132. The wedge element 134 may be followed by the dewar window 127 in the optical system 120. The dewar window 127 may have a leading or entrance surface within the first housing section 115. The trailing or exit surface of the dewar window 127 is within the second housing section 125. The optical wedge element 134 may be made of a fourth material. In some embodiments, the first and fourth material may be the same material. The dewar window 127 is made of a fifth material. The fifth material may be the same as the first and fourth materials.

Like the first set of powered lenses 132, the optical wedge element 134 operates in the variable temperature environment of the first housing section 115 which may have a first operational temperature range of approximately −30° C. to +68° C. Therefore, in real-time operation, the temperature of the optical wedge element 134 may vary or fluctuate. The fluctuating operational temperature range being the first temperature range of fluctuation. The optical wedge element 134, like each lens in the first set of powered lenses 132, may have an independent response over the real-time temperature in the housing environment associated with housing section 115. In the embodiments, the material of the optical wedge element 134, like the plurality of powered optical elements 130, may be selected to effectuate the passive athermalized response to the first temperature range of fluctuation from, for example, −30° C. to +68° C.

The imaging device 100 further comprises a motor 140 coupled via spinning guide 142 to the wedge element 134 to cause the rotation or spinning of the wedge element 134. The spinning guide 142 may be attached to the interior of first housing section 115 and arranged to allow the wedge element 134 to rotate or spin essentially in 3600 about the principal or optical axis. The details of the optical wedge element 134 will be discussed in more detail in relation to FIGS. 3 and 4A-4B.

The second set of powered lenses 152 may include lens LN4 and lens LN5 which are housed in the second housing section 125 wherein an internal temperature of the dewar 125A may be maintained at a constant temperature. For example, the dewar 125A may be maintained at a temperature of approximately −193° C. within the cavity of the second housing section 125. Nevertheless, other operational temperatures may be used. The second set of powered lenses 152 may be arranged to follow the cold stop 150.

Lens LN4 includes an input or leading surface which is convex. The exit surface or trailing surface of lens LN4 is convex. Lens LN5 may be a diverging lens which diverges light rays of electromagnetic radiation propagating along and parallel to the principal axis toward the focal plane array (FPA) 155. The lens LN4 is made of a sixth material; and lens LN5 is made of a seventh material, wherein the sixth material may be different from the seventh material.

To facilitate aberration reduction (most notably distortion), the plurality of powered optical elements 130 may be arranged on either side of the cold stop 150. Specifically, a second set of powered elements 152 of the plurality of powered elements 130 to the right of the cold stop 150 is contained in cold space at a constant temperature in the dewar 125A while the first set of powered elements 132 of the plurality of powered element 130 to the left of the cold stop 150 is disposed in a thermally fluctuating space. The first set of powered elements 132 to the left, however, is insensitive to temperature variations.

Arrangement of the plurality of powered optical elements 130 about the cold stop 150 enables reduction of monochromatic aberrations such as distortion, an aberration notoriously difficult to control and minimize in ultra-wide-field-of-view optical systems operating in any wavelength band. In some embodiments, both monochromatic and chromatic aberrations are corrected simultaneously by the plurality of powered optical elements 130.

The imaging device 100 may be installed in a dual-band situational-awareness device that provides near diffraction-limited performance over the MWIR and LWIR wavelength bands. Specifically, the plurality of optical elements may provide simultaneous monochromatic and chromatic aberration correction over the MWIR and LWIR wavelength bands along a common optical axis.

The plurality of powered optical elements 130 of the athermalized dual-band ultra-WFOV optical system 120 may compensate for FPA shifts. The embodiments herein select the powered optical elements 130 to compensate for shifts of the FPA 155 over temperature, which becomes increasingly more relevant as the F/number of a passively athermalized optical device decreases. Thus, the powered optical elements 130 provide a stable FPA 155 over temperature at a low F-number of the passively athermalized optical system 120. The embodiments herein compensate for FPA shifts optically. The FPA shift described herein refers to a longitudinal movement along the optical axis due to the variable temperature environment. By way of non-limiting example, at −30° C., the FPA 155 may move 0.002 inches closer to the optics (lenses). At +68° C., the FPA 155 may move 0.002 inches away from the optical lens. Specifically, as the dewar housing in the environment expands and contracts, the FPA may shift proportionally. Thus, the optical system 120 accommodates the FPA shift.

In some embodiments, the FPA shift may be compensated mechanically (via the coefficient of thermal expansion of optical materials, housings, and spacers). However, some embodiments will compensate for the FPA shift both optically and mechanically via a coefficient of thermal expansion (CTE).

The optical system 120 maintains performance well beyond the temperature bands described herein. A future change in temperature ($T_{constant}$) in the dewar due to a change in FPA technology merely requires a one-time manufacturing focus shift of the first set of powered elements 132 operating at temperatures ($T_{vary}$) without a need for redesign according to the temperature ($T_{constant}$).

Figure 2:
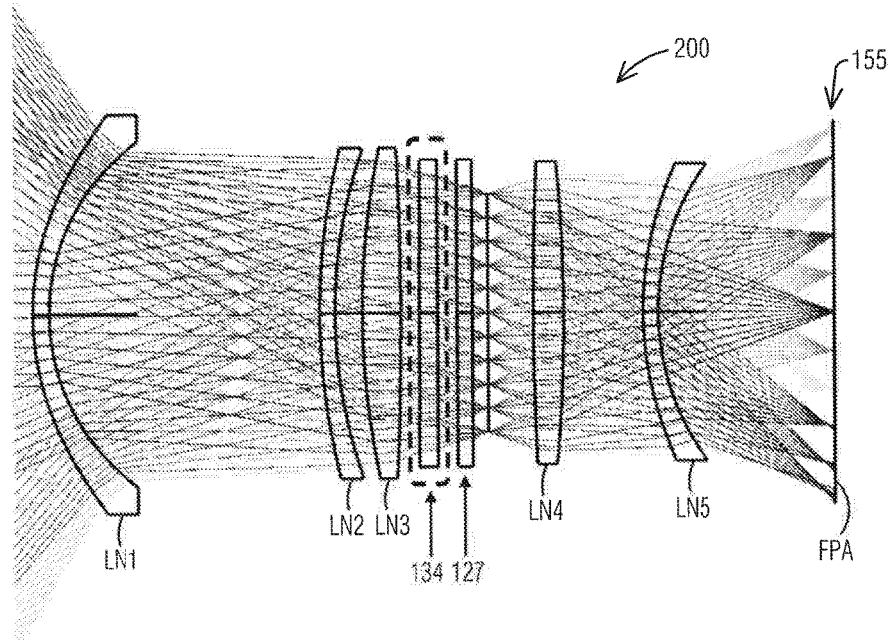
FIG. 2 illustrates a ray trace diagram of electromagnetic radiation through the dual-band imaging device of FIG. 1.

FIG. 2 illustrates a ray trace diagram 200 of electromagnetic radiation through the dual-band imaging device 100 of FIG. 1 having a plurality of powered optical elements 130. The plurality of powered optical elements 130 includes lenses LN1, LN2, LN3, LN4, and LN5.

By way of non-limiting example, the lenses LN1 and LN4 may be made of germanium. The dewar window 127 may be made of germanium as well. The dewar window 127 may be immediately proceeded by a spinning wedge element 134. The spinning wedge element 134 may be made of germanium.

The dewar window 127 is followed by lens LN4 which may be made of germanium. The lens LN2 may be barium fluoride ($BaF_2$). Lens LN3 and LN5 may be IRG26 (Infrared Chalcogenide Glass 26) manufactured by Schott Advanced Optics. The lens LN4 and lens LN5 being selected to achieve a steady-state temperature of −193° or other operating temperature of the dewar in less than seven (7) minutes.

Each lens material is subject to expansion and contraction as a function of temperature. The material has a coefficient of thermal expansion (CTE). Therefore, each lens may expand or contract at a different rate as a function of each material's own CTE. Each lens is subject to thermal defocus due to the real-time change in index of refraction with temperature (dn/dT) of the material during operation.

In some embodiments, the plurality of powered optical elements 130 of the imaging device 100 may have a relative illumination greater than 70% and transmittance greater than 70%.

Figure 3:
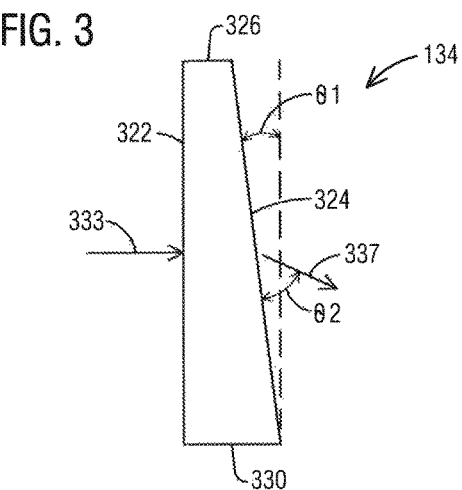
FIG. 3 illustrates a side view of the wedge element in the athermalized dual-band ultra-WFOV optical system.

FIG. 3 illustrates a side view of the wedge element 134 in the athermalized dual-band ultra-WFOV optical system. The optical wedge element 134 may be placed in afocal space, to the right of lens LN1, in order to enable frame-stacking without compromising optical performance across the image plane. An embedded optical wedge element which is converging, i.e., non-afocal space, may non-uniformly impart aberrations across the image plane. The optical wedge element 134 is configured to provide a pixel scribe-out section with a plurality of pixels.

By way of non-limiting example, the pixel scribe-out section may be up to a 20-pixel-diameter scribe-out section to enable frame-stacking capability.

The optical wedge element 134, embedded or not, imparts an angular deviation (denoted as $\theta 2$) when light (in the direction of arrow 333) passes through the optical wedge element 134. The magnitude of the deviation (denoted as $\theta 2$) increases as the wedge angle increases. By way of non-limiting example, the optical wedge element 134 may include one surface 322 which is perpendicular to the optical axis while its other (trailing or exiting) surface 324 is tilted, forming the wedge element 134 which provides an angular deviation (denoted as $\theta 2$) through the wedge element 134. The tilt angle (denoted as $\theta 1$) of the wedge element 134 is approximately 0.172 degrees, which may impart an angular deviation (denoted as $\theta 2$) in object space of approximately 0.883 degrees on the light passing therethrough, represented by arrow 337. The optical wedge element 134 may be a germanium wedge element. The optical wedge element 134 may be replaced with other wedge elements of the same thickness but with different tilt angles, thereby changing the angular deviation imparted by the wedge and thus the angular deviation in object space.

The wedge element 134 includes surfaces 326 and 330 which may be arranged at a perimeter edge of the wedge element 134. The surfaces 326 and 330 may be generally perpendicular with surface 322 and extend between leading surface 322 and trailing surface 324. Technically, surfaces 326 and 330 are the same surface but diametrically opposing points along a circumference of the wedge element 134.

The optical wedge element 134 may be coupled to a motor 140 that spins the optical wedge element 134 about the optical axis. When the optical wedge element 134 spins about the optical axis, the optical system 120 captures slightly different regions of what is essentially the same scene. The imaging device 100 may using a frame-stacking algorithm wherein the captured images are processed using a frame-stacking algorithm to improve imagery beyond what the device can provide without frame stacking, as will be discussed in relation to FIGS. 4A-4C.

The image device 100 enables frame-stacking via the optical wedge element 134 that is, in this embodiment, embedded within the optical system 120 in converging space. The wedge element 134 may be a Risley wedge. By way of non-limiting example, the optical wedge element 134 may be substituted with a germanium window with no tilted surfaces.

In applications with fewer volumetric constraints, a germanium window of thickness equivalent to the wedge thickness can be substituted for the embedded wedge element.

Figure 4A:
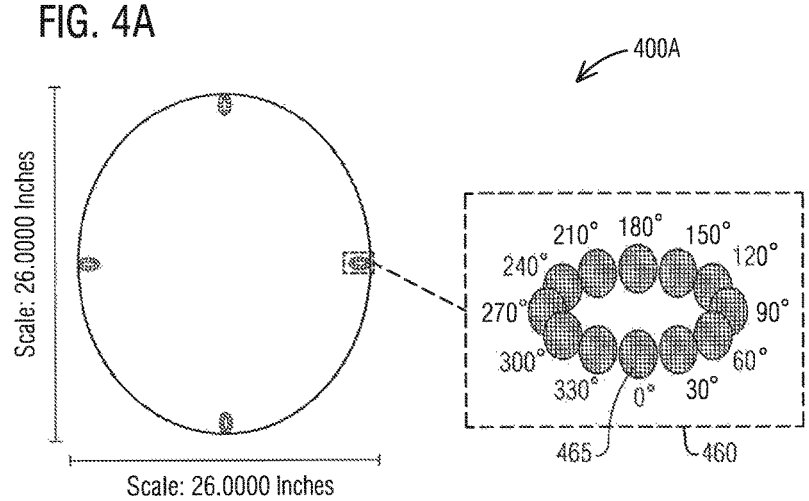
FIG. 4A illustrates a graphical representation of a spinning wedge element effect on the field of view at an observation plane in object space.

FIG. 4A illustrates a graphical representation 400A of a spinning wedge element effect on the field of view at an observation plane in object space. The wedge element 134 (FIG. 1) induces at least one pixel scribe-out section. In some embodiments, the pixel scribe-out section may be 11 pixels or up to 20 pixels. The wedge element spins about the optical axis. The spin angle 465 changes as the wedge element 134 is rotated around a 3600 circle in box denoted at 460. The locations of each spin angle 465 represented at 0°, 30°, 60°, 90°, 120°, 150°, 180°, 210°, 240°, 270°, 300°, and 330° of a circle are depicted. The observation plane is approximately 10 inches to the left of lens LN1.

Explanation of Pixel Scribe-Out Section

When the optical system 120 has a flat window in the path in lieu of the optical wedge element, the scene captured by the FPA is static. However, when the optical wedge element 134 is substituted in the path for the flat window and spun about the optical axis, the scene captured by the FPA 155 for a given spin angle is slightly offset from scenes captured by the FPA 155 at other spin angles. Examples of spin angles are 0°, 30°, 60°, 90°, 120°, 150°, 180°, 210°, 240°, 270°, 300°, and 330°. The pixels of the induced pixel scribe-out section may be increased or decreased.

By way of non-limiting example, for a wedge angle of 0.114 degrees, for example, a ray trace from object space along the optical axis impinges on the FPA 155 at a radial height of $5.120 \times 10^{-3}$ inches, which is equivalent to 130.048 micrometers. Since the pixels used in the embodiment are 20 micrometers, the deviation induced by the optical wedge element 134 at the FPA is (130.048 micrometers/20 micrometers) which equates to approximately 6.5 pixels radially, which is equivalent to an 11.0 pixel scribe-out in image space. If, using the same wedge angle, a ray is traced from the center of the FPA 155 out into object space, the angular deviation out of the device into object space is 0.585 degrees radially, which is equivalent to a full angular scribe-out section of 1.170 degrees in object space. While a pixel scribe-out section of 11 pixels is described, the pixel scribe-out section may be up to 20 pixels, for example. Greater than 20 pixels may introduce aberrations which are significant.

Figure 4B:
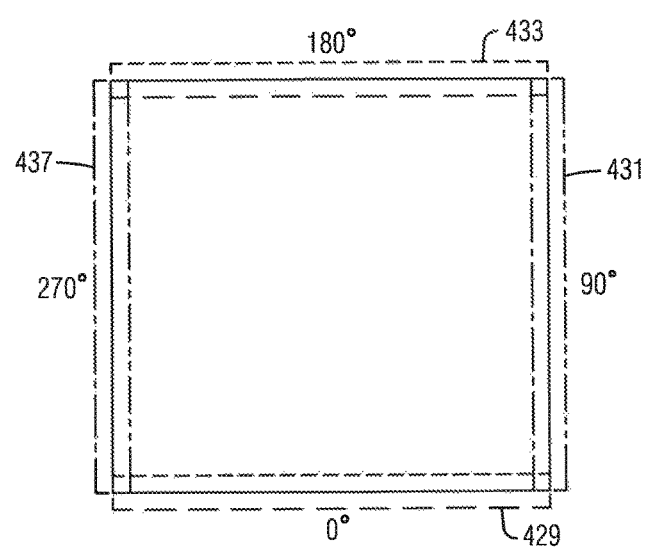
FIG. 4B illustrates a graphical representation of the frame-stacking field in object space.

FIG. 4B illustrates a graphical representation of the frame-stacking field in object space. The frame 429 is created based on the scene captured by the FPA 155 and the induced pixel scribe-out section when the wedge element 134 is at 00. Frame 431 is created based on the scene captured by the FPA 155 and the induced pixel scribe-out section when the wedge element 134 is at 90°. The frame 433 is created based on the scene captured by the FPA 155 and the induced pixel scribe-out section when the wedge element 134 is at 180°. The frame 437 is created based on the scene captured by the FPA 155 and the induced pixel scribe-out section when the wedge element 134 is at 2700.

Frame 429 corresponds to the square bounded by the long dashed parallel horizontal lines and the solid parallel vertical lines. Frame 431 corresponds to the square bounded by the vertical parallel lines represented as dash, dot, dot and the solid horizontal parallel lines. Frame 433 corresponds to the square bounded by the short dashed parallel horizontal lines and the solid vertical parallel lines. Frame 437 corresponds to the square bounded by the vertical parallel lines represented as dash, dot and the solid horizontal parallel lines.

As a point of reference, assume frame 429 creates a first frame of X×Y pixels when the wedge element 134 is at 00 wherein X corresponds to the first number of pixels in the horizontal dimension and Y corresponds to a second number of pixels in the vertical dimension. Likewise, frames 431, 433 and 437 also produce a frame of X×Y pixels. Frame 431 being a shift to the right. Frame 433 being a shift upward. Frame 437 being a shift to the left. While as a frame of reference, frame 429 is referenced as a first frame, the overlapping union of frames 429, 431, 433, and 437 has a common center frame having pixels of frame 429, 431, 433, and 437 which overlap over the area of the common center frame.

Figure 4C:
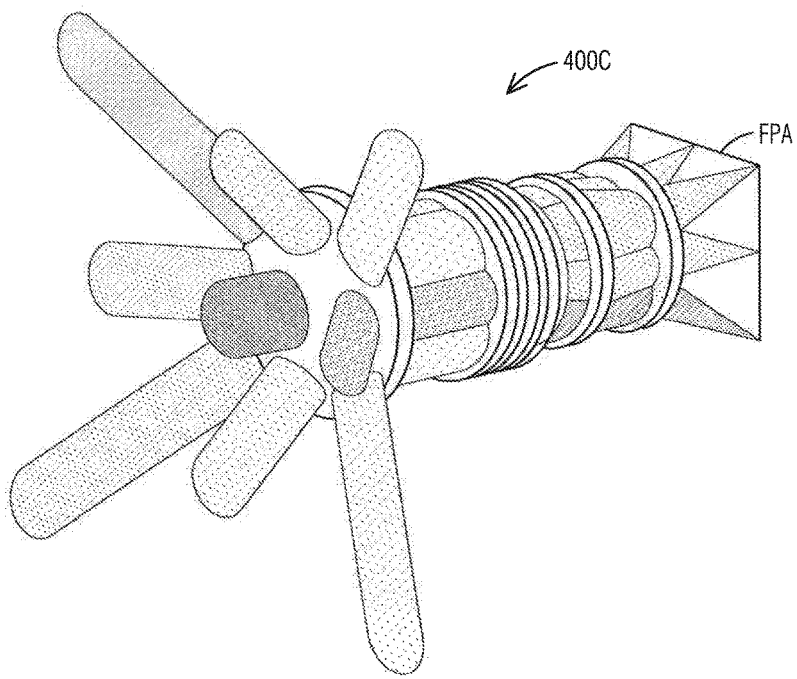
FIG. 4C illustrates the electromagnetic radiation path at a spin angle of the wedge element through the athermalized dual-band ultra-WFOV optical system.

FIG. 4C illustrates the electromagnetic radiation path 400C at a spin angle of the wedge element through the athermalized dual-band ultra-WFOV optical system 120. The illustration of FIG. 4C represents a given look position, such as without limitation at a 90° spin location of the wedge element 134.

Figure 5:
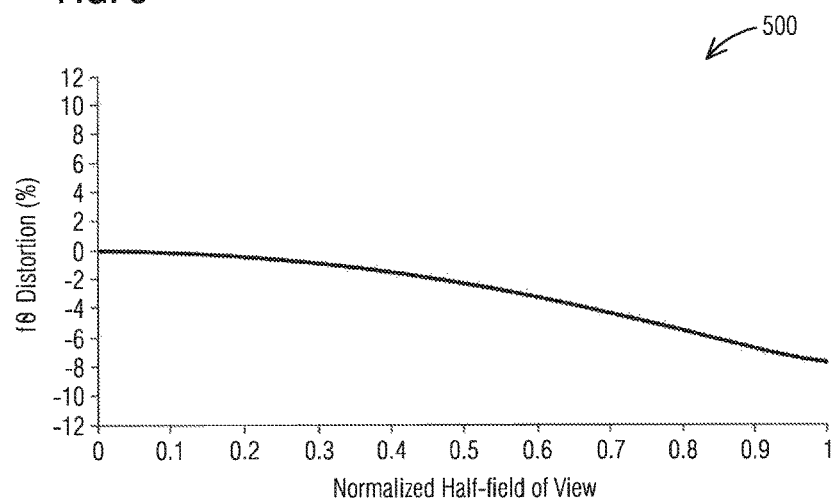
FIG. 5 illustrates a graphical representation of the f-theta distortion percentage over a normalized half-field of view using the athermalized dual-band ultra-WFOV optical system of FIG. 1.

FIG. 5 illustrates a graphical representation 500 of the f-theta (fθ) distortion percentage over a normalized half-field of view using the athermalized dual-band ultra-WFOV optical system of FIG. 1. The plurality of powered optical elements 130 may provide an fθ distortion less than the absolute value of 15% across the field of view, with a goal of fθ distortion having an absolute value of 10%. Specifically, in the embodiment shown in FIG. 5 for the prescription, the fθ distortion has an absolute value of less than |10%| over the normalized half-field of view range of 0-1.0. The θ (theta) represents the half-field view. For the embodiment, the horizontal and vertical half-field of view at 500 and 50°, respectively. In an embodiment, the full diagonal field of view is at least or greater than 1200. The field of view may be 100° in the horizontal field of view (HFOV) and 100° in the vertical field of view (VFOV).

Explanation of f-Theta (fθ) Lens

Typically, distortion-free lenses—such as those for photography—are designed such that the image height h adheres to the following relationship in equation Eq. (1) where $$h = f \tan \theta \qquad \text{Eq. (1)}$$

where f is the focal length of the optical device and θ (theta) the half-field-of-view angle. In some embodiments, the relationship between image height and field angle may be linear and the following relationship of equation Eq. (2) is imposed on the optical design where $$h = f\theta. \qquad \text{Eq. (2)}$$

The general equation for computing optical distortion in percent is defined by equation Eq. (3) where $$\text{Distortion} = 100 \times \frac{y_{chief} - y_{ref}}{y_{ref}} \qquad \text{Eq. (3)}$$

where $y_{ref}$ is equivalent to h in the preceding equations and $y_{chief}$ is the chief ray height at the image plane. It is generally desirable that the absolute value of the f-theta distortion is less than 15%. This represents a low fθ distortion.

There are many metrics that can be used to gauge how well an optical system 120 performs. One of those metrics is ensquared energy, which is an indication of how much energy from a given field point in object space lands within a given pixel at the FPA 155 (image plane) over a given wavelength band. The pixel size may be 20 micrometers by 20 micrometers. In the commercially available OpticStudio optical design and analysis software, a diffraction ensquared energy plot represents the total energy enclosed as a function of distance from the image centroid at the image of a point object.

The field points of ensquared energy plots are image heights in inches. The image centroid is the average position of all rays imaged from the object space field point. The solid line on the diffraction ensquared energy plots represents the diffraction-limited ensquared energy, which is the maximum attainable for a given F/number and given wavelength band. Ensquared energy should be greater than 0.05 over the FPA 155 with an optical wedge element 134 present.

Figure 6A:
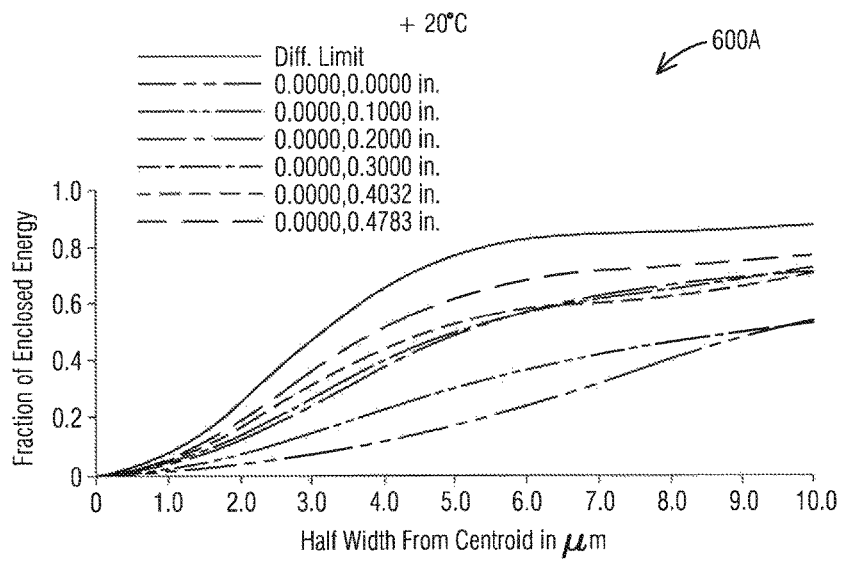
FIG. 6A illustrates curves of graphical representations denoting Fast Fourier Transform (FFT) diffraction-limited ensquared energy for the MWIR band at +20° C. temperature for different image heights.

FIG. 6A illustrates curves of graphical representations 600A denoting Fast Fourier Transform (FFT) diffraction-limited ensquared energy for the MWIR band at +20° C. temperature for different image heights. The curves represent the diffraction-limited ensquared energy and the ensquared energy at image heights of 0.0 inches, 0.1 inches, 0.2 inches, 0.3 inches, 0.4032 inches and 0.4783 inches. The ensquared energy curves of graphical representation 600A in the MWIR wavelength band may be equal to or greater than approximately 0.1 over the range of 4.0-10.0 of the half width from centroid in micrometers. The ensquared energy curves of graphical representation 600A in the MWIR wavelength band may be equal to or greater than approximately 0.2 over the range of 6.0-10.0 of the half width from centroid in micrometers. The ensquared energy curves of graphical representation 600A in the MWIR wavelength band may be equal to or greater than approximately 0.4 over the range of 8.0-10.0 of the half width from centroid in micrometers.

Figure 6B:
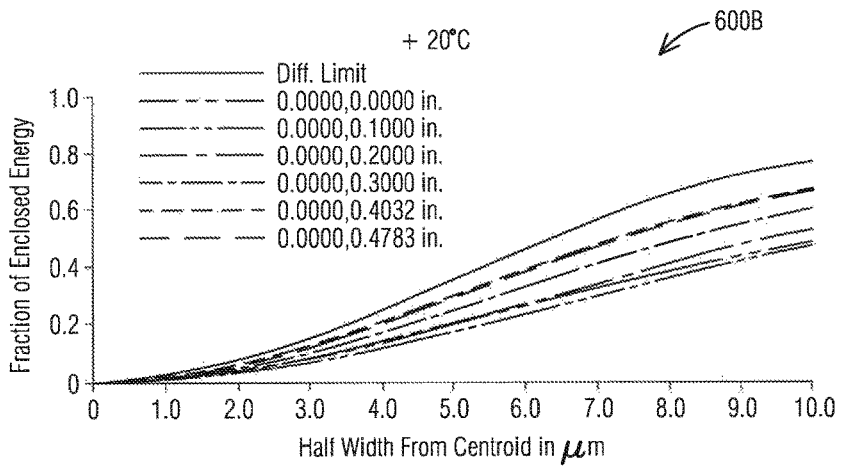
FIG. 6B illustrates curves of graphical representations denoting FFT diffraction-limited ensquared energy for the LWIR band at +20° C. temperature for different image heights.

FIG. 6B illustrates curves of graphical representations 600B denoting FFT diffraction-limited ensquared energy for the LWIR band at +20° C. temperature for different image heights. The curves represent the diffraction-limited ensquared energy and ensquared energy at image heights of 0.0 inches, 0.1 inches, 0.2 inches, 0.3 inches, 0.4032 inches and 0.4783 inches. The ensquared energy of the curves of graphical representation 600B in the LWIR wavelength band may be equal to or greater than approximately 0.1 over the range of 4.0-10.0 of the half width from centroid in micrometers. The ensquared energy of the curves of graphical representation 600B in the LWIR wavelength band may be equal to or greater than approximately 0.2 over the range of 6.0-10.0 of the half width from centroid in micrometers. The ensquared energy curves of graphical representation 600B in the LWIR wavelength band may be equal to or greater than approximately 0.4 over the range of 9.0-10.0 of the half width from centroid in micrometers.

Figure 7A:
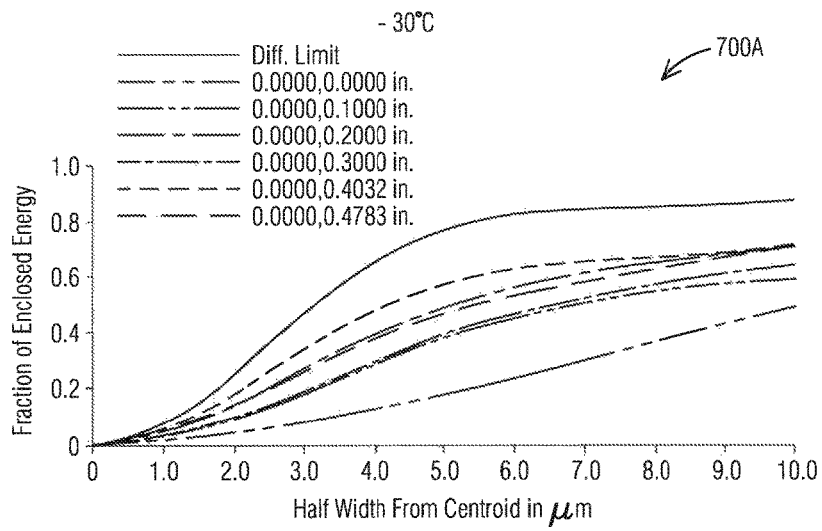
FIG. 7A illustrates curves of graphical representations denoting FFT diffraction-limited ensquared energy for the MWIR band at −30° C. temperature for different image heights.

FIG. 7A illustrates curves of graphical representations 700A denoting FFT diffraction-limited ensquared energy for the MWIR band at −30° C. temperature for different image heights. The curves represent the diffraction-limited ensquared energy and ensquared energy at image heights of 0.0 inches, 0.1 inches, 0.2 inches, 0.3 inches, 0.4032 inches, and 0.4783 inches. The ensquared energy of the curves of graphical representation 700A in the MWIR wavelength band may be equal to or greater than approximately 0.1 over the range of 4.0-10.0 of the half width from centroid in micrometers. The ensquared energy of the curves of graphical representation 700A in the MWIR wavelength band may be equal to or greater than approximately 0.2 over the range of 6.0-10.0 of the half width from centroid in micrometers. The ensquared energy curves of graphical representation 700A in the MWIR wavelength band may be equal to or greater than approximately 0.4 over the range of 8.0-10.0 of the half width from centroid in micrometers.

Figure 7B:
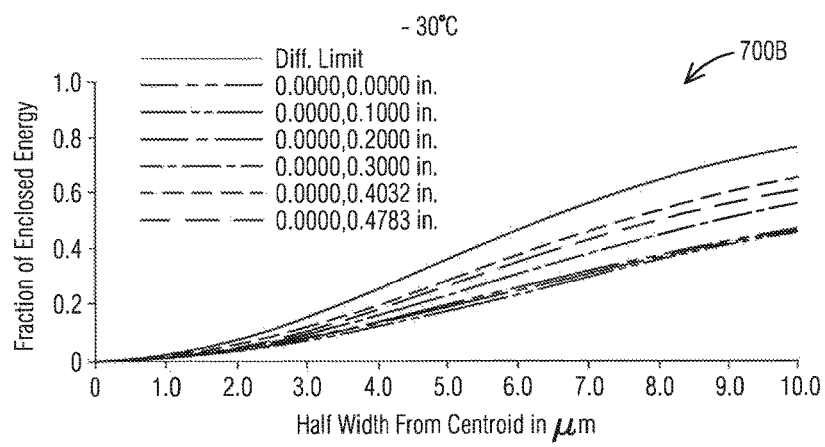
FIG. 7B illustrates curves of graphical representations denoting FFT diffraction-limited ensquared energy for the LWIR band at −30° C. temperature for different image heights.

FIG. 7B illustrates curves of graphical representations 700B denoting FFT diffraction-limited ensquared energy for the LWIR band at −30° C. temperature for different image heights. The curves represent the diffraction-limited ensquared energy and ensquared energy at image heights of 0.0 inches, 0.1 inches, 0.2 inches, 0.3 inches, 0.4032 inches, and 0.4783 inches. The ensquared energy of the curves of graphical representation 700B in the LWIR wavelength band may be equal to or greater than approximately 0.1 over the range of 4.0-10.0 of the half width from centroid in micrometers. The ensquared energy of the curves of graphical representation 700B in the LWIR wavelength band may be equal to or greater than approximately 0.2 over the range of 6.0-10.0 of the half width from centroid in micrometers. The ensquared energy curves of graphical representation 700B in the LWIR wavelength band may be equal to or greater than approximately 0.4 over the range of 9.0-10.0 of the half width from centroid in micrometers.

Figure 8A:
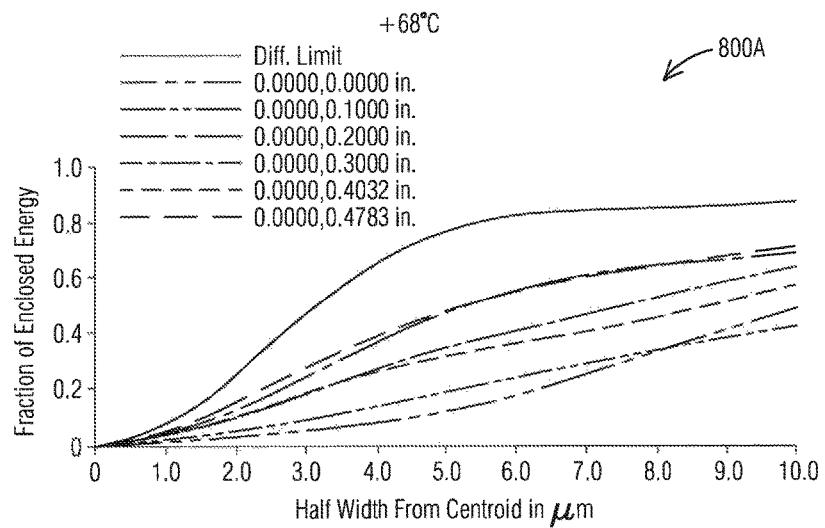
FIG. 8A illustrates curves of graphical representations denoting FFT diffraction-limited ensquared energy for the MWIR band at +68° C. temperature for different image heights.

FIG. 8A illustrates curves of graphical representations denoting FFT diffraction-limited ensquared energy for the MWIR band at +68° C. temperature for different image heights. The curves represent the diffraction-limited ensquared energy and ensquared energy at image heights of 0.0 inches, 0.1 inches, 0.2 inches, 0.3 inches, 0.4032 inches, and 0.4783 inches. The ensquared energy of the curves of graphical representation 800A in the MWIR wavelength band may be equal to or greater than approximately 0.1 over the range of 5.0-10.0 of the half width from centroid in micrometers. The ensquared energy of the curves of graphical representation 800A in the MWIR wavelength band may be equal to or greater than approximately 0.2 over the range of 7.0-10.0 of the half width from centroid in micrometers. The ensquared energy curves of graphical representation 800A in the MWIR wavelength band may be equal to or greater than approximately 0.3 over the range of 8.0-10.0 of the half width from centroid in micrometers.

Figure 8B:
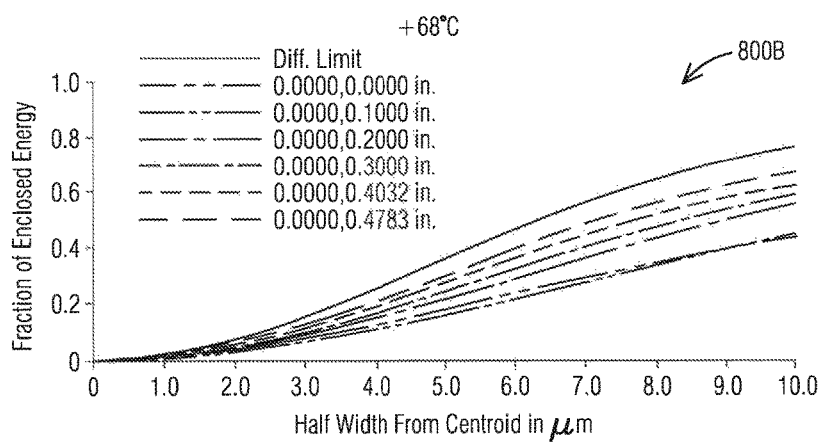
FIG. 8B illustrates curves of graphical representations denoting FFT diffraction-limited ensquared energy for the LWIR band at +68° C. temperature for different image heights.

FIG. 8B illustrates curves of graphical representations denoting FFT diffraction-limited ensquared energy for the LWIR band at +68° C. temperature for different image heights. The curves represent the diffraction-limited ensquared energy and ensquared energy at image heights of 0.0 inches, 0.1 inches, 0.2 inches, 0.3 inches, 0.4032 inches, and 0.4783 inches. The ensquared energy of the curves of graphical representation 800B in the LWIR wavelength band may be equal to or greater than approximately 0.1 over the range of 4.0-10.0 of the half width from centroid in micrometers. The ensquared energy of the curves of graphical representation 800B in the LWIR wavelength band may be equal to or greater than approximately 0.2 over the range of 6.0-10.0 of the half width from centroid in micrometers. The ensquared energy curves of graphical representation 800B in the LWIR wavelength band may be equal to or greater than approximately 0.4 over the range of 9.0-10.0 of the half width from centroid in micrometers.

FIG. 9 illustrates a table 900 of the prescription parameters of the athermalized dual-band ultra-WFOV optical system. The table 900 includes a column for optical elements in the optical system 120. The table 900 further includes columns for radius of curvature in inches; thickness in inches; material type; semi-diameter in inches; conic constant; and aspheric coefficients A4, A6, A8, and A10 applicable to the system in inch units.

Figure 10:
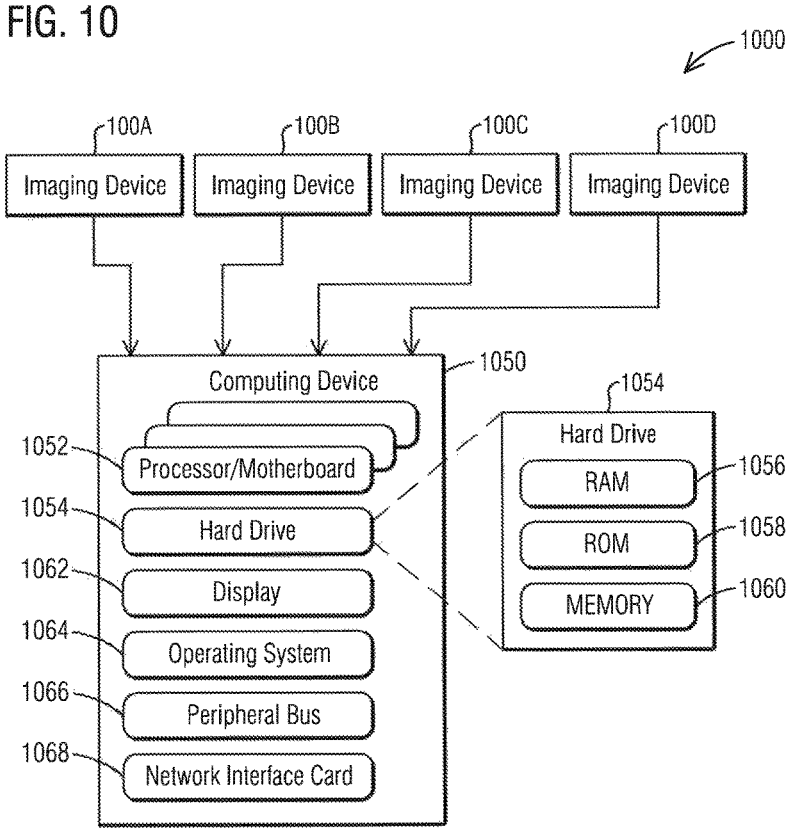
FIG. 10 illustrates a situational-awareness infrared imaging system.

FIG. 10 illustrates a situational-awareness infrared imaging system 1000. The system 1000 includes a plurality of imaging devices 100A, 100B, 100C, and 100D similar to the infrared imaging device 100 of FIG. 1. If each imaging device has a field of view of approximately 120°, then the system 1000 can perform imaging in 360° with some imaging devices having an overlapping field of view. However, the system 1000 may include three imaging devices to cover 3600. Nonetheless, the system 1000 ma include more than four imaging devices, such as six, seven, and eight imaging devices. Each of the plurality of imaging device 100A, 100B, 100C, and 100D may have an output coupled to a computing device 1050. The computing device 1050 may include one or more processors 1052 and system memory in hard drive 1054. Depending on the exact configuration and type of computing device, system memory may be volatile (such as RAM 1056), non-volatile (such as read only memory (ROM 1058), flash memory 1060, and the like) or some combination of the two. System memory may store operating system 1064, one or more applications, and may include program data for performing image processing. The computing device 1050 may carry out one or more image processing algorithms known in the art.

Computing device 1050 may also have additional features or functionality. For example, computing device 1050 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage, and non-removable storage are all examples of computer storage media. Computer storage media includes, but is not limited to, RAM, ROM, Electrically Erasable Read-Only Memory (EE-PROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of the device.

Computing device 1050 may also include or have interfaces for input device(s) (not shown) such as a keyboard, mouse, pen, voice input device, touch input device, etc. The computing device 1050 may include or have interfaces for connection to output device(s) such as a display 1062, speakers, etc. The computing device 1050 may include a peripheral bus 1066 for connecting to peripherals. Computing device 1050 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 1050 may include a network interface card 1068 to connect (wired or wireless) to a network.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as a firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD).

FIG. 11 illustrates a flowchart 1100 of a method of dual-band optical processing. The blocks shown in the method may be performed in the order shown or in a different order. One or more of the block may be performed contemporaneously. Blocks may be added or deleted.

The method 1100 includes, at block 1105, simultaneously passing and focusing mid-wave infrared (MWIR) and long-wave infrared (LWIR) spectral bands through a first set of powered lenses having a passive athermalized response over fluctuating temperatures in a variable temperature range. At block 1110, the method 1100 includes simultaneously passing and focusing the MWIR and LWIR spectral bands through a second set of powered lenses configured to operate in a constant cryogenically cooled environment having a constant temperature which is outside of the variable temperature range. At block 1115, the method includes simultaneously correcting of chromatic aberrations over the MWIR and LWIR spectral bands with a low f-theta distortion by at least one of the first set of powered lenses and the second set of powered lenses. The method may also correct monochromatic and chromatic aberrations simultaneously. At block 1120, the method includes image sensing the MWIR and the LWIR spectral bands by a focal plane array (FPA) in the cryogenically cooled environment.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

We claim:

1. An optical system comprising:
    a plurality of powered optical elements, arranged within a same optical path, configured to simultaneously pass and focus therethrough mid-wave infrared (MWIR) and long-wave infrared (LWIR) spectral bands to a focal plane array (FPA) and provide simultaneous correction of monochromatic and chromatic aberrations over the MWIR and LWIR spectral bands with a low f-theta distortion, the plurality of powered optical elements comprising:
        a first set of powered lenses having a passive athermalized response over fluctuating temperatures in a variable temperature environment; and
        a second set of powered lenses to operate in a constant cryogenically cooled environment.

2. The optical system according to claim 1, further comprising:
    a spinning wedge element inducing a pixel scribe-out section, the spinning wedge element being positioned after the first set of powered lenses and having a passive athermalized response over the fluctuating temperatures in the variable temperature environment.

3. The optical system according to claim 2, wherein the spinning wedge element induces the pixel scribe-out section of up to 20 pixels.

4. The optical system according to claim 2, wherein:
    the spinning wedge element is configured to be rotated to produce a plurality of image frames at predetermined locations along a path of rotations, an image frame is offset by a number of pixels vertically and/or horizontally with respect to a previous frame to capture multiple regions of a same scene for use in a frame-stacking algorithm.

5. The optical system according to claim 2, further comprising a dewar window positioned after the spinning wedge element and a cold stop wherein the second set of powered lenses is in proximity to the cold stop.

6. The optical system according to claim 1, wherein any and all powered lenses in the plurality of powered optical lenses has a diameter less than 1 inch wherein the plurality of powered optical elements passes polychromatic radiation from the MWIR and LWIR spectral bands.

7. The optical system according to claim 6, wherein the plurality of powered optical elements have a diagonal field of view (FOV) which is at least 120° and less than 125°.

8. An imaging device comprising:
    a housing assembly having a first housing section having a variable temperature environment and a second housing section having a cryogenically cooled environment maintained at a constant temperature;
    an optical system having a first set of powered lenses to provide a passive athermalized response over fluctuating temperatures in the variable temperature environment and a second set of powered lenses configured to operate in the cryogenically cooled environment, the optical system configured to simultaneously pass and focus therethrough mid-wave infrared (MWIR) and long-wave infrared (LWIR) spectral bands and to provide simultaneous correction of monochromatic and chromatic aberrations over dual infrared spectral bands with a low f-theta distortion; and
    a focal plane array (FPA) in the cryogenically cooled environment having a diagonal dimension larger than a diameter of each powered lens in the second set of powered lenses to image the dual infrared spectral bands.

9. The imaging device according to claim 8, wherein the optical system further comprising:
    a spinning wedge element inducing a pixel scribe-out section, the spinning wedge element being positioned after the first set of powered lenses and having a passive athermalized response over the fluctuating temperatures in the variable temperature environment.

10. The imaging device according to claim 9, wherein the spinning wedge element induces the pixel scribe-out section of up to 20 pixels.

11. The imaging device according to claim 9, wherein:
    the spinning wedge element is configured to be rotated to produce a plurality of image frames at predetermined locations along a path of rotations, an image frame is offset by a number of pixels vertically and/or horizontally with respect to a previous frame to capture multiple regions of a same scene for use in a frame-stacking algorithm.

12. The imaging device according to claim 9, wherein the second housing section is a dewar comprising a dewar window positioned after the spinning wedge element and a cold stop wherein the second set of powered lenses is in proximity to the cold stop.

13. The imaging device according to claim 8, wherein any and all powered lenses in the plurality of powered optical lenses has a diameter less than 1 inch wherein the plurality of powered optical elements passes polychromatic radiation from the MWIR and LWIR spectral bands.

14. The imaging device according to claim 8, wherein the optical system has a diagonal field of view (FOV) of at least 120° and less than 125°.

15. A method comprising:
    simultaneously passing and focusing mid-wave infrared (MWIR) and long-wave infrared (LWIR) spectral bands through a first set of powered lenses having a passive athermalized response over fluctuating temperatures in a variable temperature range;
    simultaneously passing and focusing the MWIR and LWIR spectral bands through a second set of powered lenses configured to operate in a constant cryogenically cooled environment having a constant temperature which is outside of the variable temperature range;

simultaneously correcting monochromatic and chromatic aberrations over the MWIR and LWIR spectral bands with a low f-theta distortion by the first set of powered lenses and the second set of powered lenses; and image sensing of the MWIR and the LWIR spectral bands by a focal plane array (FPA) in the cryogenically cooled environment.

16. The method according to claim 15, further comprising spinning a wedge element to induce a pixel scribe-out section, the spinning wedge element being positioned after the first set of powered lenses and having a passive athermalized response over the fluctuating temperatures in the variable temperature environment.

17. The method according to claim 16, wherein during spinning of the wedge element, producing a plurality of image frames at predetermined locations along a path of rotations, an image frame is offset by a number of pixels vertically and/or horizontally with respect to a previous frame to capture multiple regions of a same scene for use in a frame-stacking algorithm.

18. The method according to claim 16, wherein the constant cryogenically cooled environment is a dewar comprising a dewar window positioned after the wedge element and a cold stop wherein the second set of powered lenses is in proximity to a cold stop.

19. The method according to claim 15, wherein any and all powered lenses in the first set of powered lenses and the second set of powered lenses has a diameter less than 1 inch.

20. The method according to claim 19, wherein the diameter of the second set of powered lenses is smaller than a full diagonal dimension of the FPA.

* * * * *